(No Model.)
J. H. ELLIOTT
CAR TRUCK.
No. 424,282. Patented Mar. 25, 1890.
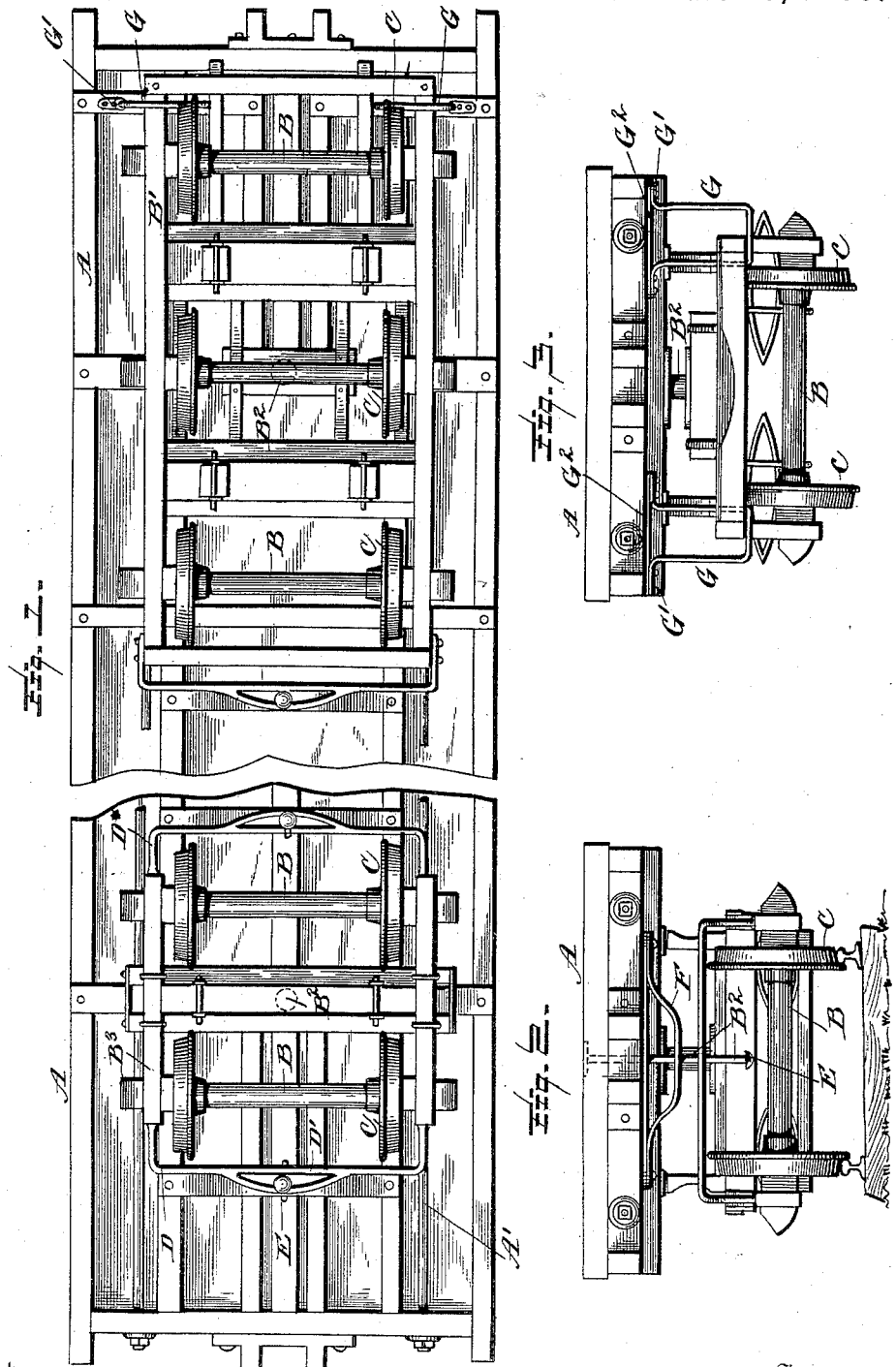
Witnesses
L. C. Hills
E. H. Bond
Inventor
J. H. Elliott
By E. B. Stocking
Attorney.

UNITED STATES PATENT OFFICE.

JAMES H. ELLIOTT, OF BROCKVILLE, ONTARIO, CANADA.

CAR-TRUCK.

SPECIFICATION forming part of Letters Patent No. 424,282, dated March 25, 1890.

Application filed October 24, 1889. Serial No. 328,060. (No model.)

*To all whom it may concern:*

Be it known that I, JAMES H. ELLIOTT, a subject of the Queen of Great Britain, residing at Brockville, Province of Ontario, Dominion of Canada, have invented certain new and useful Improvements in Car-Trucks, of which the following is a specification, reference being had therein to the accompanying drawings.

This invention has relation to certain new and useful improvements in car-trucks; and it has for its object to provide an improved car-truck either for passenger or freight cars wherein provision is made to prevent derailing of the cars for the purpose of preventing accidents and loss of life, as well as damage to the rolling-stock while in motion.

The novelty in the present instance resides in the peculiarities of construction and the combinations, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 1 is a bottom plan illustrating two forms of truck, a four-wheeled for freight-cars and a six-wheeled for passenger-coaches, but both embodying the same essential features of the invention. Fig. 2 is an end view of a truck embodying my improvement, and Fig. 3 is a like view of the six-wheeled.

Like letters of reference refer to like parts throughout the several views.

Referring to the drawings, A designates the platform, composed of suitable longitudinal and transverse timbers braced by suitable truss-rods A', but nothing new is claimed in the construction of the platform.

The axles B have suitable bearings in the frames B', which are pivotally connected with the timbers of the truck-platform by means of the king-bolts B² in the usual manner, so that the trucks or frames B' may turn on said king-bolts as a pivot.

C are wheels on the axle B. These may be of any known construction.

In order to limit the movement upon the wheel trucks or frames upon their pivots both in a horizontal and vertical direction is the object of this invention. This may be accomplished in various ways. The preferred forms are shown and will be described in this specification, although it is not intended to restrict the claims thereto.

Referring to Fig. 1, at the left hand thereof D are suitable castings attached to the side timbers B³ of the wheel frame or truck, the transverse portions thereof being formed with a slot D', in which works the vertical pin E, provided with an enlarged head of suitable size to prevent its withdrawal from the slot, the shank of the pin allowing free play of the truck-frame, the outer wall of the slot being, preferably, formed on a curve, as shown, so that as the truck is turned on its pivot the curbed wall of the slot will serve as a guide therefor. This also forms a tapered slot the end of which is curved, which will serve to gradually bring the truck-frame to a standstill as it nears its limit of movement. The upper end of the pin E is suitably secured, as indicated in dotted lines in Fig. 2, in the platform. The said pin E passes through a bearing-plate F on the under side of the car frame or platform, which serves as a support or brace to said pin E and a sort of bumper against which the casting D contacts to limit vertical movement in one direction, the head of the pin E serving to limit vertical movement in the opposite direction.

In the short truck or four-wheeled car-truck I employ the construction above described at each end of the wheel truck or frame; but in the longer trucks, as shown at the right of Fig. 1, there is oftentimes not sufficient room at the forward end for such construction, in which cases I employ the means illustrated at the forward end of said truck and also in Fig. 3, employing, preferably, at the rear end the construction above described in connection with the shorter truck. This consists of substantially U-shaped pieces G, having flanged ends G', which are connected to or are designed to rest upon plates G², which are secured to the timbers of the platform at the under side thereof. These pieces G loosely embrace the longitudinal timbers of the truck-frame at the forward end, as shown, and allow of free play within certain limits, the play being limited by contact with the side bars or legs of said pieces G. These pieces can be arranged inside the end cross-pieces of the truck-frame, as shown, so as not to interfere with the draw-head and its attachments.

The operation will be readily understood. The trucks are free to turn upon their pivots sufficiently for all practical purposes, such as going around curves; but the horizontal movement, as well as the vertical movement, is restricted by the engagement of the moving parts with the pin E or with the side bars and cross-bars of the pieces G, as the case may be. I may sometimes employ either of the above forms at one end of the truck only, leaving the other end free; but I prefer to employ the same at both ends.

While I have referred in the above description to my improvement as applied to passenger and freight trucks, it is evident that the same is applicable to the engine and tender trucks as well.

If a train should be derailed while in motion, the car or cars might continue to run alone on the sleepers on the track for some time and might have to pass over a curvature. In so doing the U-shaped pieces G on the vertical pin E, provided with enlarged head, would support or hold up the truck and prevent it from dropping down as soon as the car would reach the curvature, and thus prevent an accident. My construction also prevents the ditching of the cars, as it prevents the truck from spinning around at right angles to the rail, keeping the wheels of the truck in line with the track on the sleepers.

What I claim as new is—

1. The combination, with the platform and pivoted truck, of the slotted casting on the truck and the fixed pin engaging the slot of the casting, as set forth.

2. The combination, with the platform and pivoted truck, of the casting D on the truck formed with a transverse slot tapering in two directions from its center, either end of which is curved, and the fixed pin on the platform working in said slot, as set forth.

3. The combination, with the platform and pivoted truck, of the casting D, secured to one end of the truck and formed with a transverse slot, the outer wall of which is on the arc of a circle, and the vertical fixed pin on the platform engaging said slot and having an enlarged head, substantially as shown and described.

4. The combination, with the platform and pivoted truck, of a casting secured to one end of the truck and having a transverse slot, a fixed pin on the platform engaging said slot and the U-shaped pieces G on the platform, and loosely embracing the longitudinal timbers of the other end of the truck, substantially as shown and described.

In testimony whereof I affix my signature in presence of two witnesses.

JAMES H. ELLIOTT.

Witnesses:
JAMES WRIGHT,
KENNETH M. LAUGHLIN.